United States Patent
Amano

[11] Patent Number: 5,906,651
[45] Date of Patent: May 25, 1999

[54] MISFIRE DETECTING DEVICE OF MULTICYLINDER INTERNAL COMBUSTION ENGINE

[75] Inventor: Hidetoshi Amano, Okazaki, Japan

[73] Assignee: Toyota Jidosha Kabushiki Kaisha, Aichi-ken, Japan

[21] Appl. No.: 09/080,039

[22] Filed: May 15, 1998

[30] Foreign Application Priority Data

May 23, 1997  [JP]  Japan ................................ 9-133937

[51] Int. Cl.$^6$ .......................... G01M 15/00; F02D 45/00; F02B 77/08
[52] U.S. Cl. .......................... 701/110; 73/116; 73/117.3; 123/419; 123/436
[58] Field of Search .................. 73/116, 117.2, 73/117.3; 123/419, 436; 701/110, 111

[56] References Cited

U.S. PATENT DOCUMENTS

| | | | |
|---|---|---|---|
| 5,442,955 | 8/1995 | Baba | 73/117.3 |
| 5,513,521 | 5/1996 | Klenk et al. | 73/117.3 |
| 5,539,644 | 7/1996 | Ichikawa et al. | 701/111 |
| 5,639,960 | 6/1997 | Nakagawa | 123/419 |

FOREIGN PATENT DOCUMENTS

| | | |
|---|---|---|
| 4-365958 | 12/1992 | Japan . |
| 5-33717 A | 2/1993 | Japan . |
| 6-2609 | 1/1994 | Japan . |

*Primary Examiner*—George Dombroske
*Attorney, Agent, or Firm*—Kenyon & Kenyon

[57] ABSTRACT

A rotational fluctuation amount between consecutively ignited cylinders is sequentially calculated. When the rotational fluctuation amount exceeds a first predetermined value and an emergence interval of the rotational fluctuation assumes a predetermined value, or when the rotational fluctuation amount exceeds a second predetermined value larger than the first predetermined value, the rotational fluctuation is judged to result from misfire. A cylinder subjected to the rotational fluctuation is then specified. By comparing rotational fluctuation amounts in the specified cylinder, and the two cylinders firing immediately after the specified cylinder, a determination is made as to whether it is only the specified cylinder which has misfired, the specified cylinder and the cylinder immediately following the specified cylinder have consecutively misfired, or the specified cylinder and a cylinder other than the immediately following cylinder have intermittently misfired.

6 Claims, 8 Drawing Sheets

MISFIRE DETECTING DEVICE OF MULTICYLINDER INTERNAL COMBUSTION ENGINE

INCORPORATION BY REFERENCE

The disclosure of Japanese Patent Application No. HEI 9-133937 filed on May 23, 1997 including the specification, drawings and abstract is incorporated herein by reference in its entirety.

FIELD OF THE INVENTION

The present invention relates to a misfire detecting device for an internal combustion engine and, more particularly, relates to a misfire detecting device for a multi-cylinder internal combustion engine.

BACKGROUND OF THE INVENTION

Since an ignition failure in a spark ignition engine, so-called misfire, adversely affects combustion, concentrations of emission substances and driving comfort, various measures have been taken to prevent occurrences of misfire. Nevertheless, misfire may occur for some reason. Thus, it has been demanded to detect the occurrences of misfire as early and precisely as possible.

For example, Japanese Patent Application Laid-Open No. HEI No. 5-33717 discloses a misfire detecting device for a multi-cylinder internal combustion engine. This device compares a mean deviation of a mean revolution during an explosion stroke of consecutively ignited cylinders with first and second predetermined values (the first predetermined value<the second predetermined value). If the mean deviation is larger than the first and second predetermined values, it is determined that a plurality of cylinders is subjected to misfire. If the mean deviation is larger than the first predetermined value but smaller than the second predetermined value, it is determined that only one cylinder is subjected to misfire.

The aforementioned device can detect the occurrence of misfire either in a case where one cylinder is subjected to misfire or in a case where two cylinders are consecutively subjected to misfire. However, the device cannot precisely detect the occurrence of misfire in a case where two cylinders are intermittently subjected to misfire, that is, a cylinder disposed between the two cylinders is in a normal combustion state.

SUMMARY OF THE INVENTION

The present invention has been devised in consideration of the aforementioned problem. It is thus an object of the present invention to provide a misfire detecting device capable of not only detecting the occurrence of misfire but also determining whether one of the cylinders is subjected to misfire, two of the cylinders are consecutively subjected to misfire, or two of the cylinders are intermittently subjected to misfire.

A first aspect of the present invention provides: rotational fluctuation amount calculating means for sequentially calculating an amount of rotational fluctuation between consecutively ignited cylinders based on a difference between a time period corresponding to a predetermined crank angle during an explosion stroke of a cylinder and a time period corresponding to a predetermined crank angle during an explosion stroke of a cylinder that precedes the cylinder in an ignition sequence; misfire determination means for determining, when the rotational fluctuation amount calculated exceeds a first predetermined value, that rotational fluctuation periodically occurs every time a certain cylinder is ignited and for determining, when the rotational fluctuation amount exceeds a second predetermined value which is larger than the first predetermined value, that the rotational fluctuation results from misfire; misfire cylinder specification means for specifying a cylinder subjected to the rotational fluctuation judged by the misfire determination means to result from misfire; and misfire pattern determination means for determining whether only the cylinder specified by the misfire cylinder specification means is subjected to misfire, the specified cylinder and a cylinder undergoing an explosion stroke immediately after the specified cylinder are consecutively subjected to misfire, or the specified cylinder and a cylinder other than that undergoing an explosion stroke immediately after the specified cylinder are intermittently subjected to misfire, by comparing a rotational fluctuation amount in the cylinder specified by the misfire cylinder specification means with rotational fluctuation amounts in at least two cylinders undergoing an explosion stroke immediately after the specified cylinder.

A second aspect of the present invention provides a misfire detecting method corresponding to the misfire detecting device according to the present invention.

Thus, the present invention makes it possible to precisely determine whether one of the cylinders is subjected to misfire, two of the cylinders are consecutively subjected to misfire, or two of the cylinders are intermittently subjected to misfire.

Further, the misfire determination means according to the first aspect may include: misfire temporary determination means for temporarily determining, when the rotational fluctuation amount exceeds the first predetermined value, that the rotational fluctuation results from misfire; misfire temporary determination fluctuation emergence interval detection means for detecting an emergence interval of the rotational fluctuation temporarily judged to result from misfire; periodical fluctuation determination means for determining, when the emergence interval of the rotational fluctuation temporarily judged to result from misfire assumes a predetermined value, that the rotational fluctuation temporarily judged to result from misfire periodically occurs every time a certain cylinder is ignited; misfire final determination means for determining, when the rotational fluctuation temporarily judged to result from misfire and judged to be a periodical fluctuation exceeds the second predetermined value which is larger than the first predetermined value, that the rotational fluctuation results from misfire; and misfire cylinder specification means for specifying a cylinder subjected to the rotational fluctuation judged by the misfire final determination means to result from misfire. The step of determining the occurrence of misfire according to the second aspect may include steps corresponding to the aforementioned means.

Still further, the aforementioned misfire pattern determination means according to the first aspect may determine whether only the cylinder specified by the misfire cylinder specification means is subjected to misfire, the specified cylinder and a cylinder undergoing an explosion stroke immediately after the specified cylinder are consecutively subjected to misfire, or the specified cylinder and a cylinder undergoing an explosion stroke two cylinders after the specified cylinder are intermittently subjected to misfire, by comparing a rotational fluctuation amount in the cylinder specified by the misfire cylinder specification means, a rotational fluctuation amount in the cylinder undergoing an explosion stroke immediately after the specified cylinder, and a rotational fluctuation amount in the cylinder undergoing an explosion stroke two cylinders after the specified cylinder. The step of determining the pattern of misfire according to the second aspect is a step corresponding to the misfire pattern determination means.

Still further, the misfire pattern determination means according to the first aspect may calculate a rotational fluctuation amount 1 in the cylinder N1 specified by the misfire cylinder specification means, a rotational fluctuation amount 2 in the cylinder N2 next to the cylinder N1, and a rotational fluctuation amount 3 in the cylinder N3 next to the cylinder N2 and, provided that k1 and k2 are predetermined constants, determine:

(1) when amount 1×k1<amount 3, the cylinders N1 and N3 are intermittently subjected to misfire;

(2) when amount 1×k1≧amount 3 and amount 1×k2<amount 2, the cylinders N1 and N2 are consecutively subjected to misfire; and (3) when amount 1×k1≧amount 3 and amount 1×k2≧amount 2, only the cylinder N1 is subjected to misfire. The step of determining the pattern of misfire according to the second aspect corresponds to the misfire pattern determination means. Based on the aforementioned criteria, it is thus possible to determine whether the cylinders N1 and N3 are intermittently subjected to misfire, the cylinders N1 and N2 are consecutively subjected to misfire, or only the cylinder N1 is subjected to misfire.

BRIEF DESCRIPTION OF THE DRAWINGS

Further objects, features and advantages of the present invention will become apparent from the following description of a preferred embodiment with reference to the accompanying drawings, wherein.

DETAILED DESCRIPTION

A preferred embodiment of the present invention will now be described with reference to the accompanying drawings.

Figure 1:
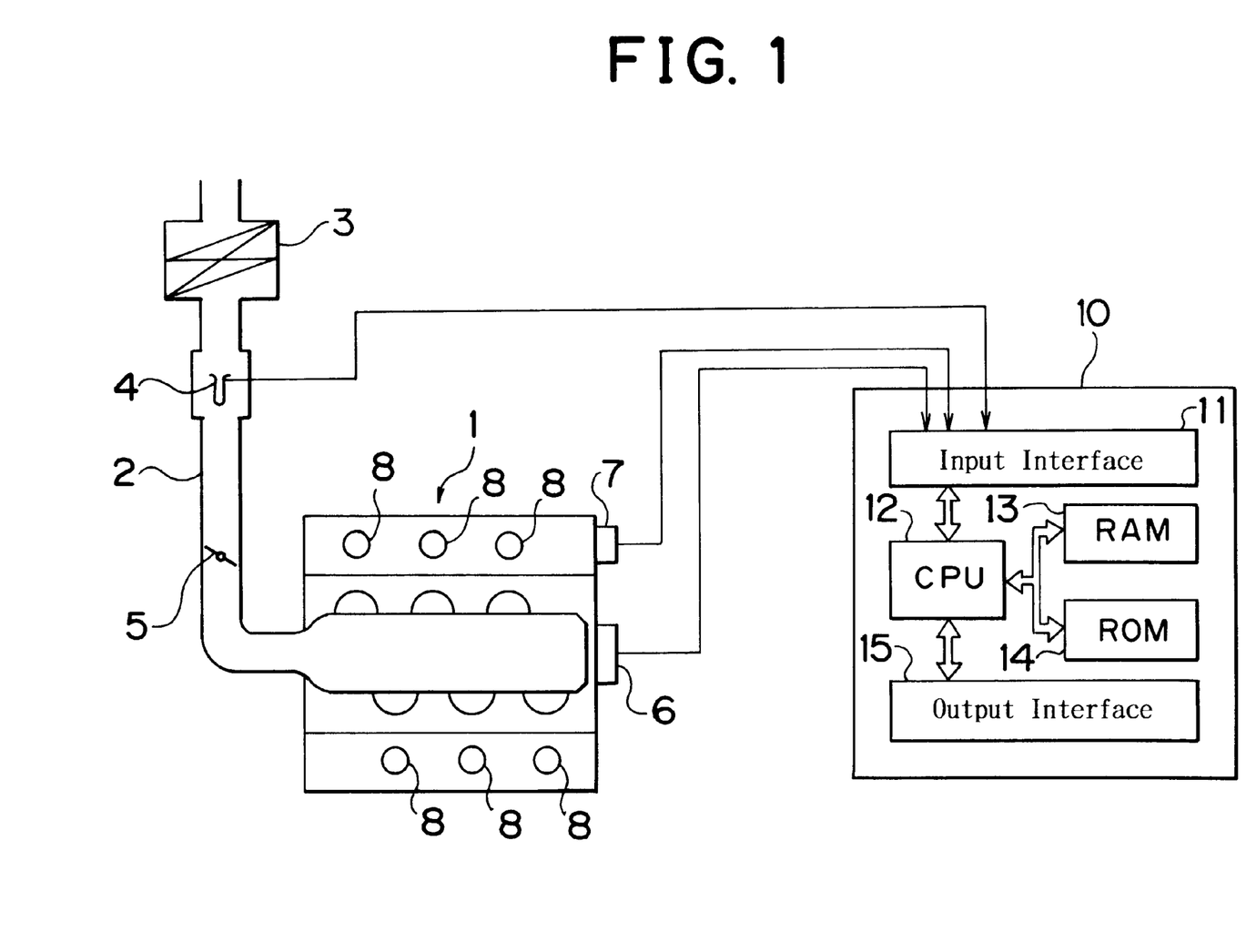
FIG. 1 illustrates the entire construction of the present invention.

FIG. 1 is a structural view of a misfire detecting device according to the present invention with a twin-three engine 1 mounted on a vehicle. The engine 1 has cylinders #1, #3 and #5 arranged on one bank thereof and cylinders #2, #4 and #6 arranged on the other bank thereof. Each of the cylinders of the engine 1 is provided with an ignition plug 8. The cylinders #1, #2, #3, #4, #5 and #6 are ignited in this sequence.

The engine 1 has an intake passage 2 which is provided with an air flow meter 4 for measuring an amount of intake air supplied from an air cleaner 3 and a throttle valve 5. A crank angle sensor 6 detects a rotational angle of a crank shaft. A reference position sensor 7 generates a reference position signal based on rotation of a cam shaft. Every time the crank shaft rotates twice, that is, by 720°, the reference position sensor 7 generates a reference position signal. More specifically, the reference position sensor 7 generates a reference position signal when a piston in the cylinder #1 reaches its top dead center during a compression stroke thereof.

An engine control unit 10 (hereinafter referred to as ECU) is composed of a digital computer and provided with an input interface 11, a CPU 12, a RAM 13, a ROM 14 and an output interface 15 that are interconnected with one another. The CPU 12 performs a misfire detecting process of the present invention by carrying out a later-described calculation based on signals inputted through the input interface 11 from the air flow meter 4, the crank angle sensor 6 and the reference position sensor 7. Besides, the CPU 12 performs many control processes including basic ones such as fuel injection amount control, ignition timing control and the like. Hence, the CPU 12 is provided with many other sensors (not illustrated) necessary for the aforementioned control processes.

Figure 2:
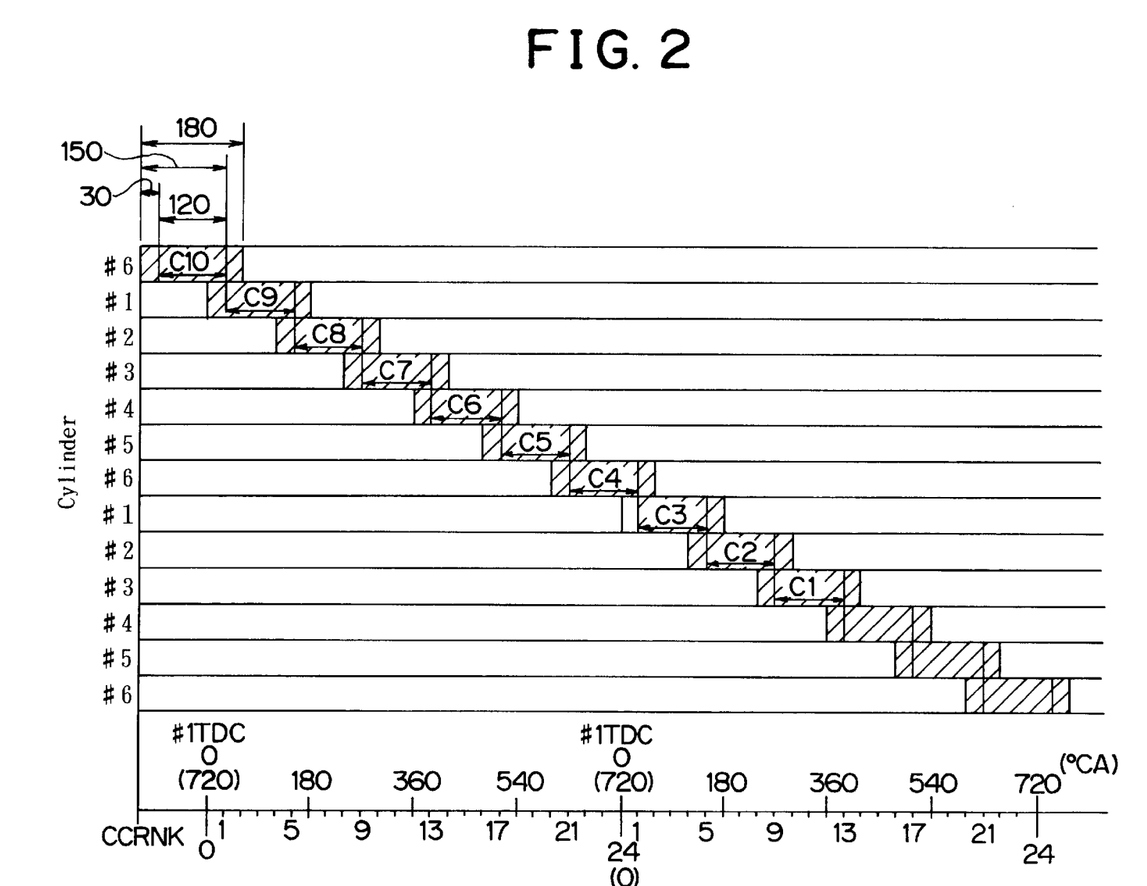
FIG. 2 illustrates measured time periods required for a crank shaft to rotate by a predetermined angle during an explosion stroke of respective cylinders.

FIG. 2 indicates when and in which sequence the respective cylinders undergo an explosion stroke (180° CA; crank angle) provided that the crank shaft assumes a crank angle of 0° CA when the piston in the cylinder #1 of the engine 1 reaches its top dead center during the compression stroke. The explosion strokes of the respective cylinders are indicated by hatched areas in FIG. 2. Each hatched area indicated by a bi-directional arrow marked with CN represents a predetermined time period to be measured starting when the crank shaft assumes 30° CA and ending when the crank shaft assumes 150° CA. That is, when this predetermined time period is measured, the crank shaft rotates by 120° CA.

Hereinafter, reference symbol TN will be defined as follows:

T1 is a time period required for the crank shaft to rotate by 120° CA to cover a predetermined area C1 during an explosion stroke of a cylinder that has just been ignited;

T2 is a time period required for the crank shaft to rotate by 120° CA to cover a predetermined area C2 during an explosion stroke of a cylinder that was ignited one cylinder earlier in the ignition sequence than the aforementioned cylinder;

T3 is a time period required for the crank shaft to rotate by 120° CA to cover a predetermined area C3 during an explosion stroke of a cylinder that was ignited two cylinders earlier in the ignition sequence than the aforementioned cylinder;

T4 is a time period required for the crank shaft to rotate by 120° CA to cover a predetermined area C4 during an explosion stroke of a cylinder that was ignited three cylinders earlier in the ignition sequence than the aforementioned cylinder; and TN is a time period required for the crank shaft to rotate by 120° CA to cover a predetermined area CN during an explosion stroke of a cylinder that was ignited (N−1) cylinders earlier in the ignition sequence than the aforementioned cylinder.

Further, reference symbol TN (rotational fluctuation amount) will be defined as follows:

rotational fluctuation amount T1=T1−T2;

rotational fluctuation amount T2=T2−T3;

rotational fluctuation amount T3=T3−T4;
rotational fluctuation amount T4=T4−T5; and
rotational fluctuation amount TN=TN−T(N+1).

Each of these symbols represents a difference in time period required for the crank shaft to rotate by 120° CA to cover a predetermined area between two cylinders that are consecutively ignited. In other words, it represents a difference in rotational fluctuation amount between two cylinders that consecutively undergo an explosion stroke.

Figure 3:
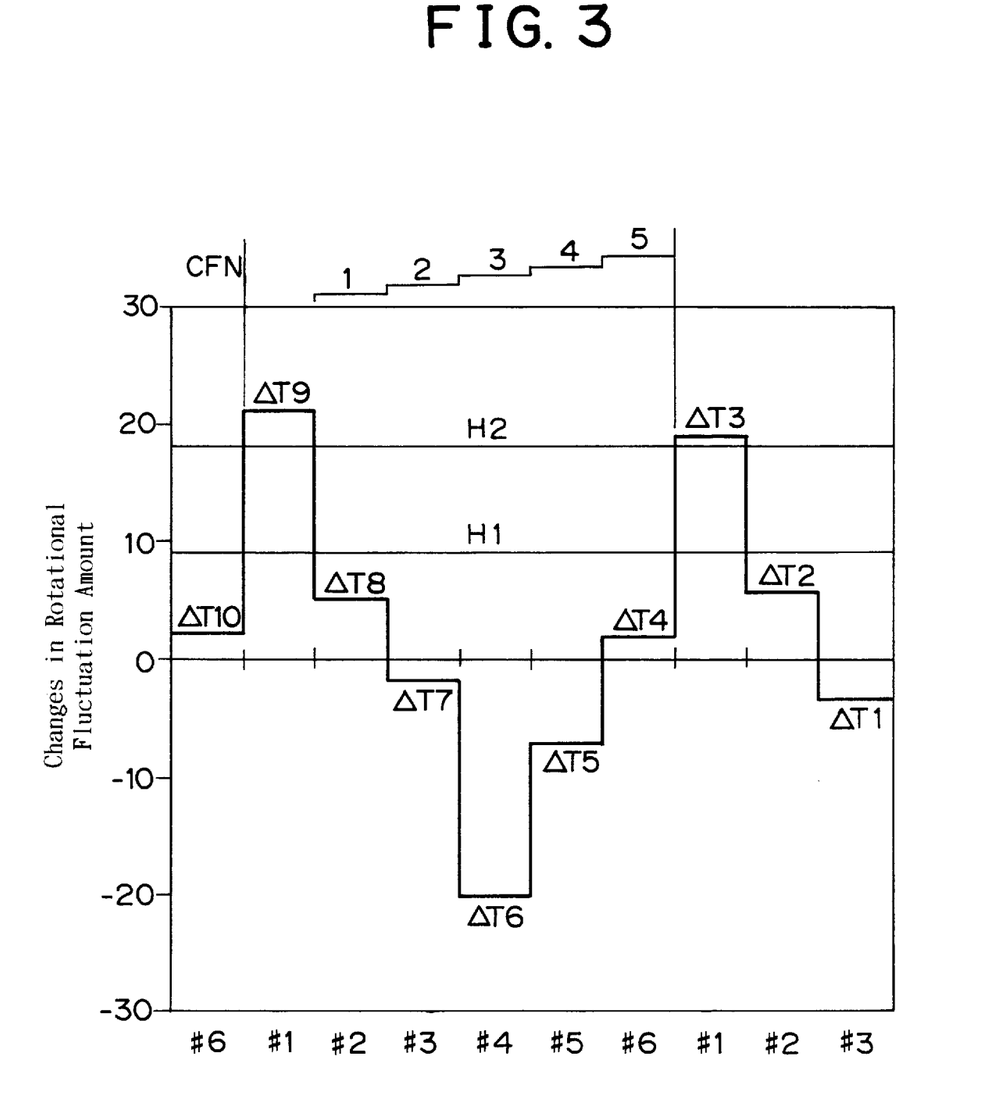
FIG. 3 illustrates rotational fluctuation in a case where one of the cylinders is subjected to misfire.
Figure 4:
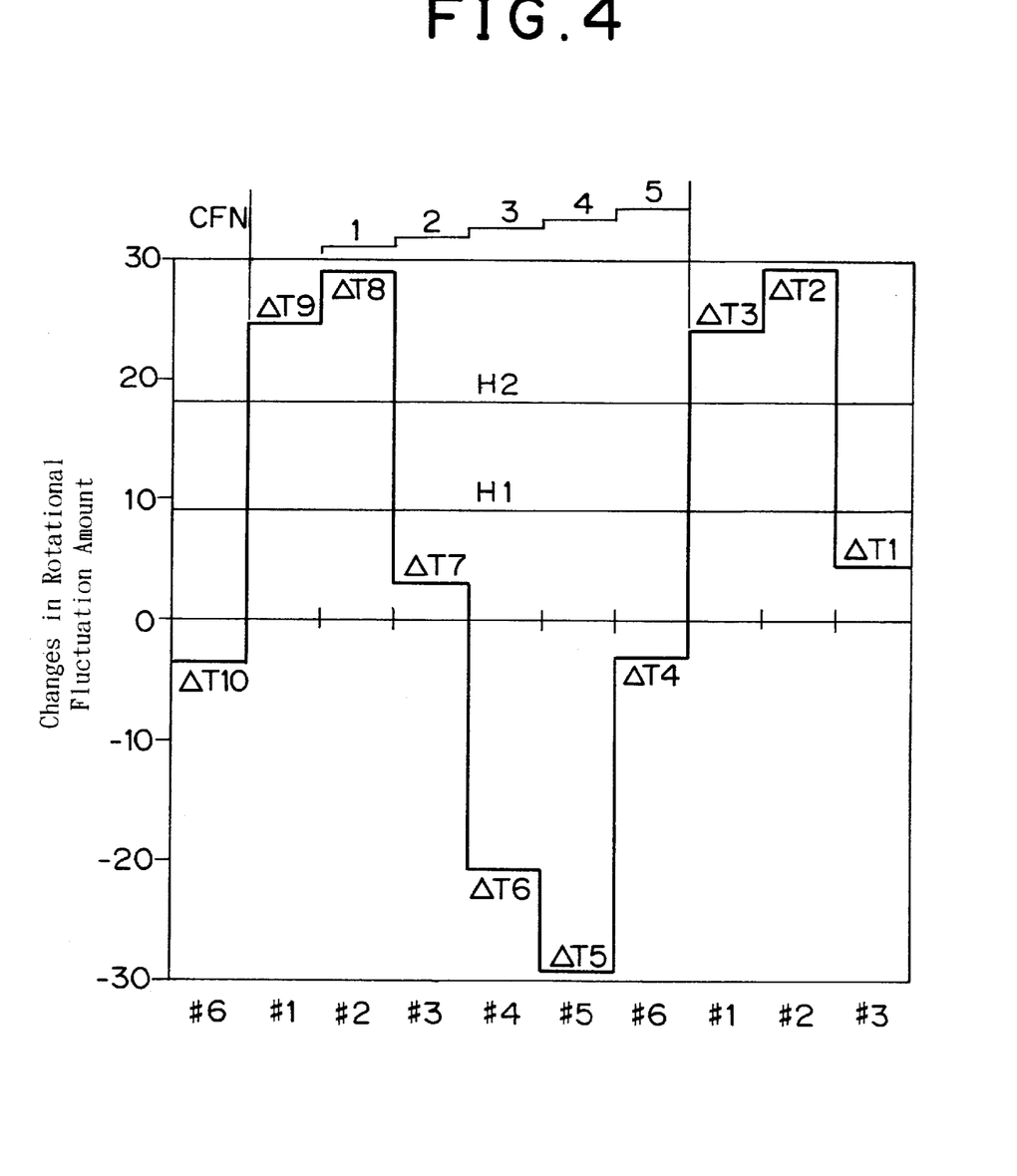
FIG. 4 illustrates rotational fluctuation in a case where two of the cylinders are consecutively subjected to misfire.
Figure 5:
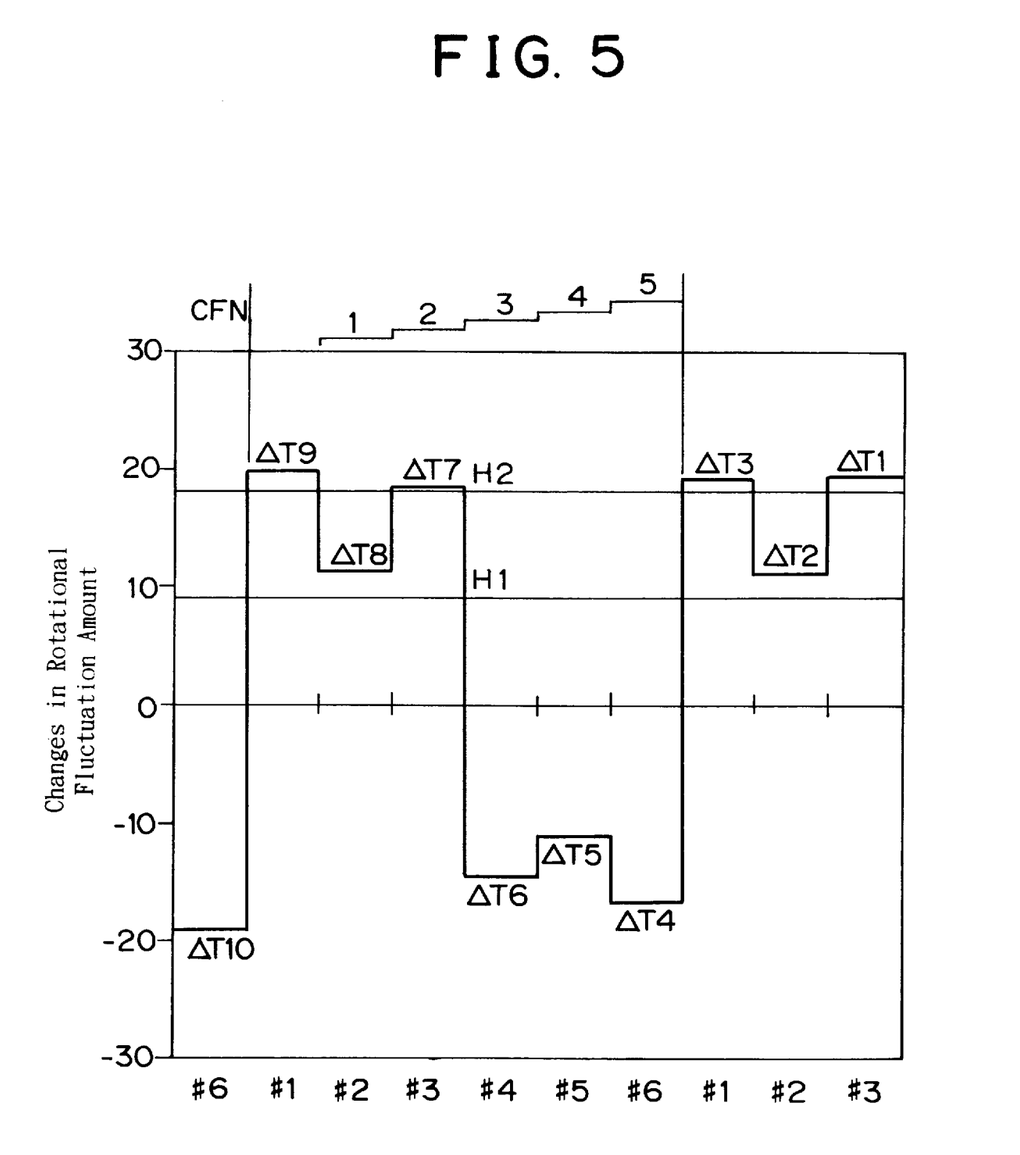
FIG. 5 illustrates rotational fluctuation in a case where two of the cylinders are intermittently subjected to misfire.

FIG. 3 illustrates changes in rotational fluctuation amount TN in a case where only the cylinder #1 is periodically subjected to misfire while FIG. 4 illustrates changes in rotational fluctuation amount TN in a case where the cylinders #1 and #2 are consecutively subjected to misfire periodically. FIG. 5 illustrates changes in rotational fluctuation amount TN in a case wherein cylinders #1 and #3 are intermittently subjected to periodic misfire.

In each of FIGS. 3 through 5, T1 indicates the latest rotational fluctuation between the cylinder #3 and the cylinder #2 which is ignited immediately before the cylinder #3 is ignited.

As can be seen from FIG. 3, the rotational fluctuation amount T3 in the cylinder #1 assumes a large positive value. This indicates that because the cylinder #1 is subjected to misfire, the time period (T3) required for the crank shaft to rotate by 120° CA to cover the predetermined area (C3 in FIG. 2) during an explosion stroke of the cylinder #1 has become longer than the time period (T4) required for the crank shaft to rotate by 120° CA to cover the predetermined area (C4 in FIG. 2) during an explosion stroke of the cylinder #6 which is ignited immediately before the cylinder #1 is ignited.

The rotational fluctuation amount T2 in the cylinder #2 assumes a positive value, which indicates that the time period (T2) required for the crank shaft to rotate by 120° CA to cover the predetermined area (C2 in FIG. 2) during an explosion stroke of the cylinder #2 has become even longer than the time period (T3) required for the crank shaft to rotate by 120° CA to cover the predetermined area (C3 in FIG. 2) during an explosion stroke of the cylinder #1. In this case, however, there is a relatively small difference between the time period (T2) and the time period (T3). Thus, it can be determined that the cylinder #2 is not subjected to misfire. If the cylinder #2 is subjected to misfire immediately after the cylinder #1, the rotational fluctuation amount T2 assumes a much larger value as can be seen from FIG. 4.

The rotational fluctuation amount T1 in the cylinder #3 assumes a negative value, which indicates that the time period (T1) required for the crank shaft to rotate by 120° CA to cover the predetermined area (C1 in FIG. 2) during an explosion stroke of the cylinder #3 has become shorter than the time period (T2) required for the crank shaft to rotate by 120 CA to cover the predetermined area (C2 in FIG. 2) during an explosion stroke of the cylinder #2. This indicates that the rotational speed of the crank shaft has increased. Thus, it is evident that none of cylinders #2 and #3 are subjected to misfire.

Referring to FIG. 4, as is the case with FIG. 3, the rotational fluctuation amount T3 in the cylinder #1 assumes a large positive value. This indicates that because the cylinder #1 is subjected to misfire, the time period (T3) required for the crank shaft to rotate by 120° CA to cover the predetermined area (C3 in FIG. 2) during an explosion stroke of the cylinder #1 has become longer than the time period (T4) required for the crank shaft to rotate by 120° CA to cover the predetermined area (C4 in FIG. 2) during an explosion stroke of the cylinder #6 which is ignited immediately before the cylinder #1 is ignited.

The rotational fluctuation amount T2 in the cylinder #2 assumes a positive value almost as large as the rotational fluctuation amount T3 in the cylinder #1. This indicates that because the cylinder #2 is subjected to misfire, the time period (T2) required for the crank shaft to rotate by 120° CA to cover the predetermined area (C2 in FIG. 2) during an explosion stroke of the cylinder #2 has become even longer than the time period (T3) required for the crank shaft to rotate by 120° CA to cover the predetermined area (C3 in FIG. 2) during an explosion stroke of the cylinder #1.

The rotational fluctuation amount T1 in the cylinder #3 assumes a positive value, but there is a relatively small difference between the time period (T1) and the time period (T2). Thus, it can be determined that the cylinder #3 is not subjected to misfire.

Referring to FIG. 5, as is the case with FIG. 3, the rotational fluctuation amount T3 in the cylinder #1 assumes a large positive value. This indicates that because the cylinder #1 is subjected to misfire, the time period (T3) required for the crank shaft to rotate by 120° CA to cover the predetermined area (C3 in FIG. 2) during an explosion stroke of the cylinder #1 has become longer than the time period (T4) required for the crank shaft to rotate by 120° CA to cover the predetermined area (C4 in FIG. 2) during an explosion stroke of the cylinder #6 which is ignited immediately before the cylinder #1 is ignited.

Although the rotational fluctuation amount T2 in the cylinder #2 assumes a positive value, it is smaller than that shown in FIG. 4.

The rotational fluctuation amount T1 in the cylinder #3 assumes a large value, which indicates that cylinder #3 is subjected to misfire, and the time period (T1) required for the crank shaft to rotate by 120° CA to cover the predetermined area (C1 in FIG. 2) during an explosion stroke of the cylinder #3 has become longer than the time period (T2) required for the crank shaft to rotate by 120° CA to cover the predetermined area (C2 in FIG. 2) during an explosion stroke of the cylinder #2 which is ignited immediately before the cylinder #3 is ignited.

As described above, the present invention aims to detect the periodical occurrences of misfire and, more specifically, to detect whether only one of the cylinders is subjected to misfire, two of the cylinders are consecutively subjected to misfire, or two of the cylinders are intermittently subjected to misfire.

First of all, it is necessary to see if rotation of the crank shaft periodically fluctuates. Referring now to FIGS. 3 through 5, a first rise in rotational fluctuation amount resulting from misfire is generated every six cylinders. That is, the first rise in rotational fluctuation amount is generated in the cylinder #1 regardless of whether only the cylinder #1 is subjected to misfire, the cylinders #1 and #2 are consecutively subjected to misfire, or the cylinders #1 and #3 are intermittently subjected to misfire.

Accordingly, in this case, an interval from a rise in rotational fluctuation amount in the cylinder #1 to a subsequent rise in rotational fluctuation amount in the cylinder #1 is counted. If the interval counted corresponds to six cylinders, it can be determined that rotation of the crank shaft periodically fluctuates.

More concretely, a first criterion value H1 for detecting a rise in rotational fluctuation amount is set. Also provided is a counter for counting up the number of cylinders one by one after the first criterion value H1 has been exceeded. If the counter has counted up to a predetermined number (five, in the case of six cylinders) by the time the first criterion value H1 is exceeded next time, it can be determined that rotation of the crankshaft periodically fluctuates.

The first criterion value H1 is designed to detect that rotation of the crankshaft periodically fluctuates. Whether or not such rotational fluctuation of the crank shaft results from misfire is determined by a later-described second criterion value H2. Thus, the first criterion value H1 should not be set to a large value.

If one of the cylinders is subjected to misfire, or if two of the cylinders are consecutively subjected to misfire or two of the cylinders are intermittently subjected to misfire, a first rise in rotational fluctuation amount can easily be recognized. This is because a rotational state of the crank shaft is normal before such misfire occurs. Hence, the first criterion value H1 need not be set to a large value.

The misfire detecting device according to the present invention includes misfire temporary determination means for temporarily determining that the rotational fluctuation amount calculated results from the occurrence of misfire. The misfire temporary determination means detects the aforementioned rise in rotational fluctuation amount. If misfire occurs, a change in rotation of the crank shaft tends to be more easily recognized by detecting a rise in rotational fluctuation amount than by detecting a fall in rotational fluctuation amount. Thus, the first criterion value H1 can be set to a small value.

If it has been confirmed that rotation of the crankshaft periodically fluctuates, it is then determined whether only one of the cylinders is subjected to misfire, two of the cylinders are consecutively subjected to misfire, or two of the cylinders are intermittently subjected to misfire. Hence, it is necessary to check rotational fluctuation amounts in three cylinders that are consecutively ignited on condition that the first ignited of the three cylinders is subjected to misfire.

If the rotational fluctuation amount corresponding to T1 has been calculated, it is then determined whether the rotational fluctuation amount corresponding to T3 results from misfire. Hence, it is determined whether T3 has exceeded a second criterion value H2 that is preliminarily set larger than the first criterion value H1. Only when it is determined that T3 has exceeded the second criterion value H2, is it determined whether only one of the cylinders is subjected to misfire, two of the cylinders are consecutively subjected to misfire, or two of the cylinders are intermittently subjected to misfire.

This determination is made based on respective patterns of change in rotational fluctuation amount as illustrated in FIGS. 3 through 5. Whether only one of the cylinders is subjected to misfire, two of the cylinders are consecutively subjected to misfire, or two of the cylinders are intermittently subjected to misfire is determined as follows according to the pattern of changes in rotational fluctuation amount.

(1) It is determined that only one of the cylinders is subjected to misfire when:

For three consecutively ignited cylinders, the rotational fluctuation amount in the first cylinder is large, the rotational fluctuation amount in the second cylinder is small and the rotational fluctuation amount in the third cylinder is small.

(2) It is determined that two of the cylinders are consecutively subjected to misfire when:

For three consecutively ignited cylinders, the rotational fluctuation amount in the first cylinder is large, the rotational fluctuation amount in the second cylinder is large, and the rotational fluctuation amount in the third cylinder is small.

(3) It is determined that two of the cylinders are intermittently subjected to misfire when:

For three consecutively ignited cylinders, the rotational fluctuation amount in the first cylinder is large, the rotational fluctuation amount in the second cylinder is small and the rotational fluctuation amount in the third cylinder is large.

Comparison of the aforementioned respective patterns of changes reveals that the rotational fluctuation amount in the third cylinder is large in case (3) and that, in cases (1) and (2), the rotational fluctuation amount in the third cylinder is small. However, the rotational fluctuation amount in the second cylinder is large in case (2), and the rotational fluctuation amount in the second cylinder is small in case (1).

When the rotational fluctuation amount in the third cylinder is obtained as the latest rotational fluctuation amount T1 and the latest rotational fluctuation amount T1 is larger than a first product of the rotational fluctuation amount in the cylinder ignited two cylinders earlier in the ignition sequence than the aforementioned third cylinder by an experimentally obtained coefficient k1, it is determined that two of the cylinders are intermittently subjected to misfire. When the rotational fluctuation amount T1 is not larger than the first product, only one of the cylinders may be subjected to misfire or two of the cylinders may be consecutively subjected to misfire. Thus, it is determined whether or not the rotational fluctuation amount T2 in the cylinder ignited one cylinder earlier in the ignition sequence than the third cylinder is larger than a second product of the rotational fluctuation amount T3 in the cylinder ignited two cylinders earlier in the ignition sequence than the third cylinder by an experimentally obtained coefficient k2. If the rotational fluctuation amount T2 is larger than this second product, it is determined that two of the cylinders are consecutively subjected to misfire. If the rotational fluctuation amount T2 is not larger than this second product, it is determined that only one of the cylinders is subjected to misfire. The following relationship can be established between the aforementioned coefficients: k1, k2<1. Although the coefficients k1, k2 may be equal to each other, the coefficients k1, k2 may be different from each other by a predetermined value.

It is then determined which cylinder is subjected to misfire. For this purpose, the misfire detecting device of this embodiment is provided with the crank angle sensor 6 and the reference position sensor 7. The crank angle sensor 6 generates a signal every time the crank shaft rotates by 30° CA. The reference position sensor 7 generates a reference position signal every time the crank shaft rotates by 720° CA and, more specifically, when the piston in the cylinder #1 reaches its top dead center during a compression stroke thereof. It is then determined which cylinder is subjected to misfire by calculating the number of signals generated by the crank angle sensor 6 when the second criterion value H2 has been exceeded due to misfire. Starting from the reference position (the top dead center of the cylinder #1), the crank angle sensor 6 generates a signal every time the crank shaft rotates by 30° CA. The more detailed description will follow based on a flowchart.

Figure 6:
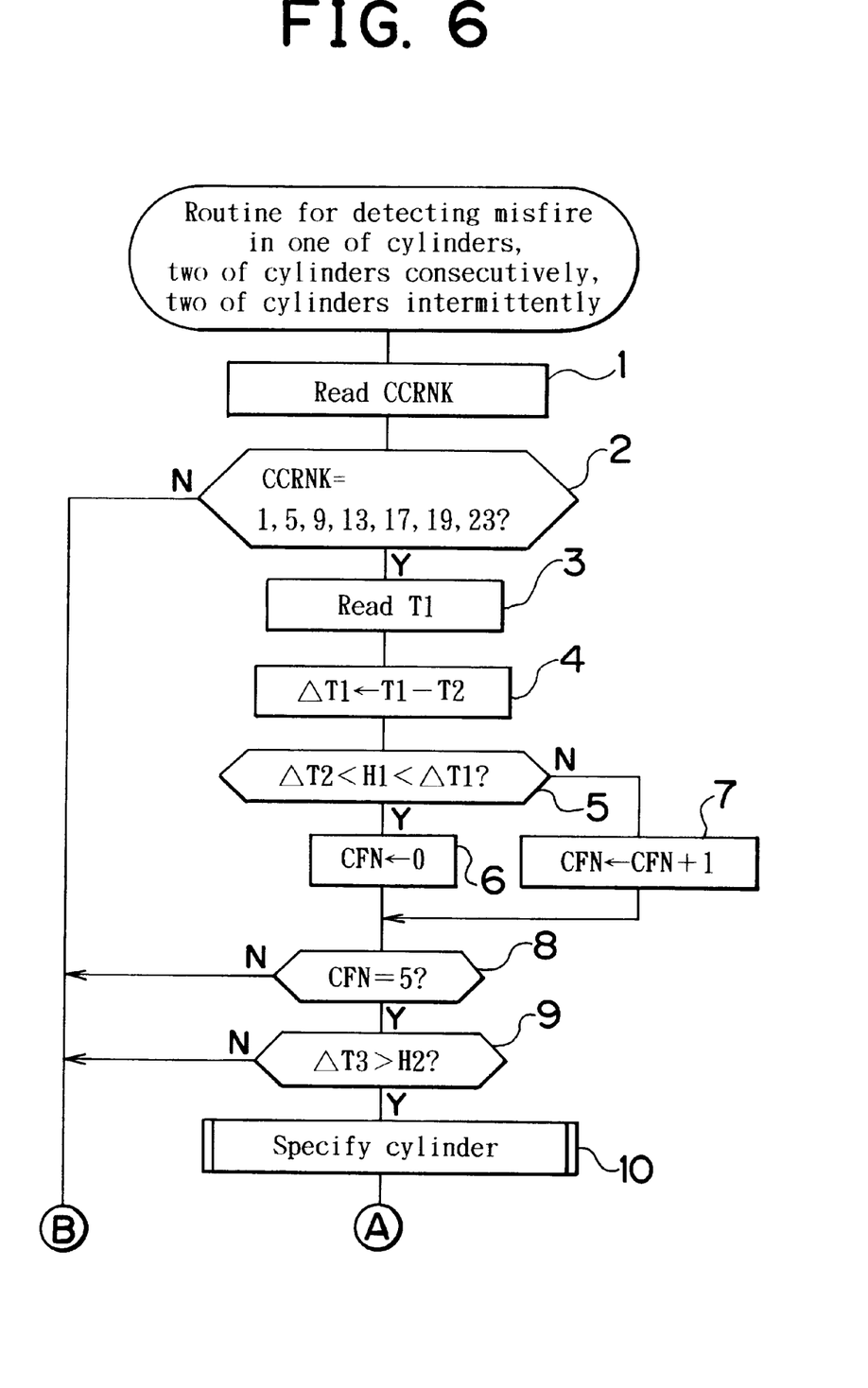
FIG. 6 is a flowchart of a control routine of the present invention.
Figure 7:
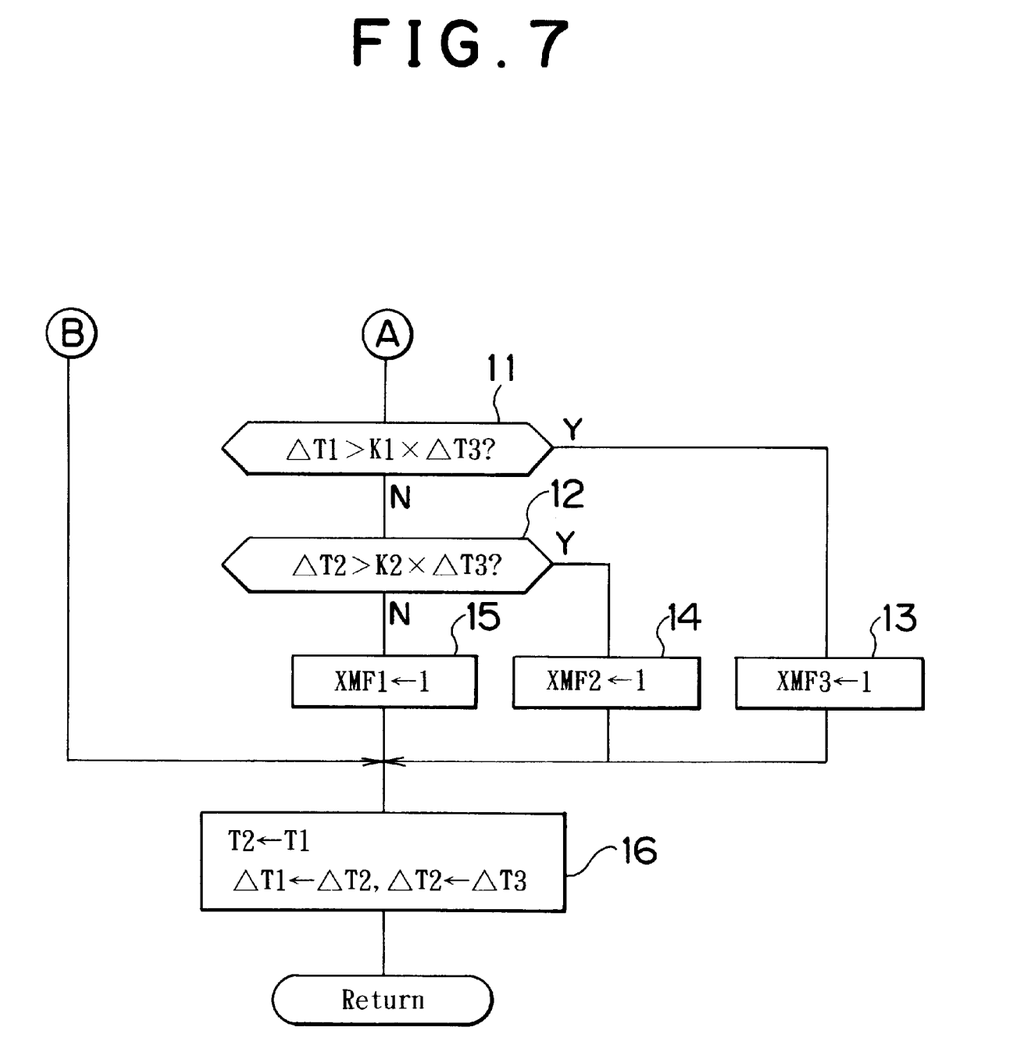
FIG. 7 is a flowchart of the control routine of the present invention.

A misfire detecting routine of the present invention based on the aforementioned thoughts will hereinafter be described with reference to flowcharts as shown in FIGS. 6 and 7.

This routine undergoes interruption handling every time the crank shaft rotates by 30° CA. In step 1, it is determined whether the routine undergoes interruption handling at a timing at which the crank shaft rotates by 30° CA, 150° CA, 270° CA, 390° CA, 510° CA or 630° CA after generation of a reference position signal by the reference position sensor 7. The reference position sensor 7 generates a reference position signal every time the crank shaft rotates by 720° CA and, more specifically, when the piston in the cylinder #1 reaches its top dead center during a compression stroke thereof. Thus, a starting point for measuring rotational fluctuation amount is determined.

In this embodiment, a rotor (not shown) of the crank angle sensor 6 attached to the crank shaft has convex portions disposed at intervals of 30 ° CA so that 24 pulses are generated while the crank shaft rotates twice. In addition, the crank angle sensor 6 has crank angle counter (not shown), whose count value CCRNK is reset to zero in response to generation of a signal generated by the reference position sensor 7 when the piston in the cylinder #1 reaches its top dead center during a compression stroke thereof. Thereafter, every time the crank shaft rotates by 30° CA, that is, every time one pulse is generated, the count value CCRNK increases by one. Thus, the count value CCRNK assumes a value ranging from 0 to 23.

In step 1, the count value CCRNK of the crank angle counter is read. In step 2, it is determined whether the count value CCRNK assumes 1, 5, 9, 13, 17 or 21. These numbers correspond to a timing at which the crank shaft rotates by 30° CA, 150° CA, 270°CA, 390° CA, 510° CA or 630° CA after the piston in the cylinder #1 has reached its top dead center. If YES in step 2, the operation proceeds to step 3. If NO in step 2, the operation returns to the initial step.

A timer assumes a value T1 which is reset when the routine undergoes interruption handling. In step 3, this value T1 is read so that a time period required for the crank shaft to rotate by 120° CA until the routine undergoes interruption handling next time. Besides, in step 3, various parameters necessary for carrying out calculation of this routine are read. Included in these parameters are a value TN stored in the RAM 13 and a value CFN assumed by a later-described fluctuation interval counter.

In step 4, T2 is subtracted from T1 so that the difference in time period T1 is obtained. T1 represents a difference between the time period required for the crank shaft to rotate by 120° CA during an explosion stroke of a cylinder and the time period required for the crank shaft to rotate by 120° CA during an explosion stroke of another cylinder that is ignited immediately before the aforementioned cylinder is ignited.

In step 5, it is determined whether or not the difference in time period T2 obtained by subtracting T2 from T3 is smaller than the aforementioned criterion value H1 and whether or not the difference in time period T1 obtained by subtracting T1 from T2 is larger than the aforementioned criterion value H1. The step 5 corresponds to the misfire temporary determination means.

If YES in step 5, the fluctuation interval counter CFN is cleared in step 6 and the operation proceeds to step 8. If NO in step 5, the fluctuation interval counter CFN is increased by one in step 7 and the operation proceeds to step 8. In step 8, it is determined whether or not the fluctuation interval counter CFN assumes 5. If T1 represents the first rise in rotational fluctuation amount, the operation proceeds from step 6 to step 8 as a matter of course. The step 7 corresponds to misfire temporary determination fluctuation emergence interval detection means.

If NO in step 8, the operation returns to the initial step. However, if it is determined that rotation of the crank shaft periodically fluctuates in step 8, the operation proceeds to step 9. The step 8 corresponds to periodical fluctuation determination means. The determination according to the present invention is made on condition that a cylinder ignited two cylinders earlier in the ignition sequence than the cylinder currently ignited is subjected to misfire. Thus, it is determined in step 9 whether or not T3 exceeds the criterion value H2. If NO in step 9, the operation returns to the initial step. However, if it is determined in step 9 that the cylinder ignited two cylinders earlier in the ignition sequence than the cylinder currently ignited is subjected to misfire, the operation proceeds to step 10. The step 9 corresponds to misfire final determination means, and the step 10 corresponds to misfire cylinder specification means.

In step 10, it is determined which cylinder is subjected to misfire provided that the cylinder is ignited two cylinders earlier in the ignition sequence than the cylinder currently ignited. If the count value CCRNK of the crank angle counter assumes 13 when this routine undergoes interruption handling, it can be concluded that the crank shaft has rotated by 390° CA since the piston in the cylinder #1 reached its top dead center (See FIG. 2). Accordingly, T1 represents a time period required for the crank shaft to rotate by 120° CA to cover the predetermined area C1 shown in FIG. 2 during an explosion stroke of the cylinder #3, the time period starting when the crank shaft has rotated by 270° CA since the piston in the cylinder #1 reached its top dead center and ending when the crank shaft has rotated by 390° CA since the piston in the cylinder #1 reached its top dead center. Likewise, T2 represents a time period required for the crank shaft to rotate by 120° CA to cover the predetermined area C2 shown in FIG. 2 during an explosion stroke of the cylinder #2, the time period starting when the crank shaft has rotated by 150° CA since the piston in the cylinder #1 reached its top dead center and ending when the crank shaft has rotated by 270° CA since the piston in the cylinder #1 reached its top dead center. T3 represents a time period required for the crank shaft to rotate by 120° CA to cover the predetermined area C3 shown in FIG. 2 during an explosion stroke of the cylinder #1, the time period starting when the crank shaft has rotated by 30° CA since the piston in the cylinder #1 reached its top dead center and ending when the crank shaft has rotated by 150° CA since the piston in the cylinder #1 reached its top dead center. T4 represents a time period required for the crank shaft to rotate by 120° CA during an explosion stroke of the cylinder #6, the time period starting 30 when the crank shaft has to rotate by 90° CA before the piston in the cylinder #1 reaches its top dead center and ending when the crank shaft has rotated by 30° CA since the piston in the cylinder #1 reached its top dead center.

Further, T1 is obtained by subtracting T2 from T1, T2 is obtained by subtracting T3 from T2 , and T3 is obtained by subtracting T4 from T3. Thus, if T3 has exceeded the second criterion value H2 in step 9, it can be concluded that at least the cylinder #1 is subjected to misfire.

Figure 8:
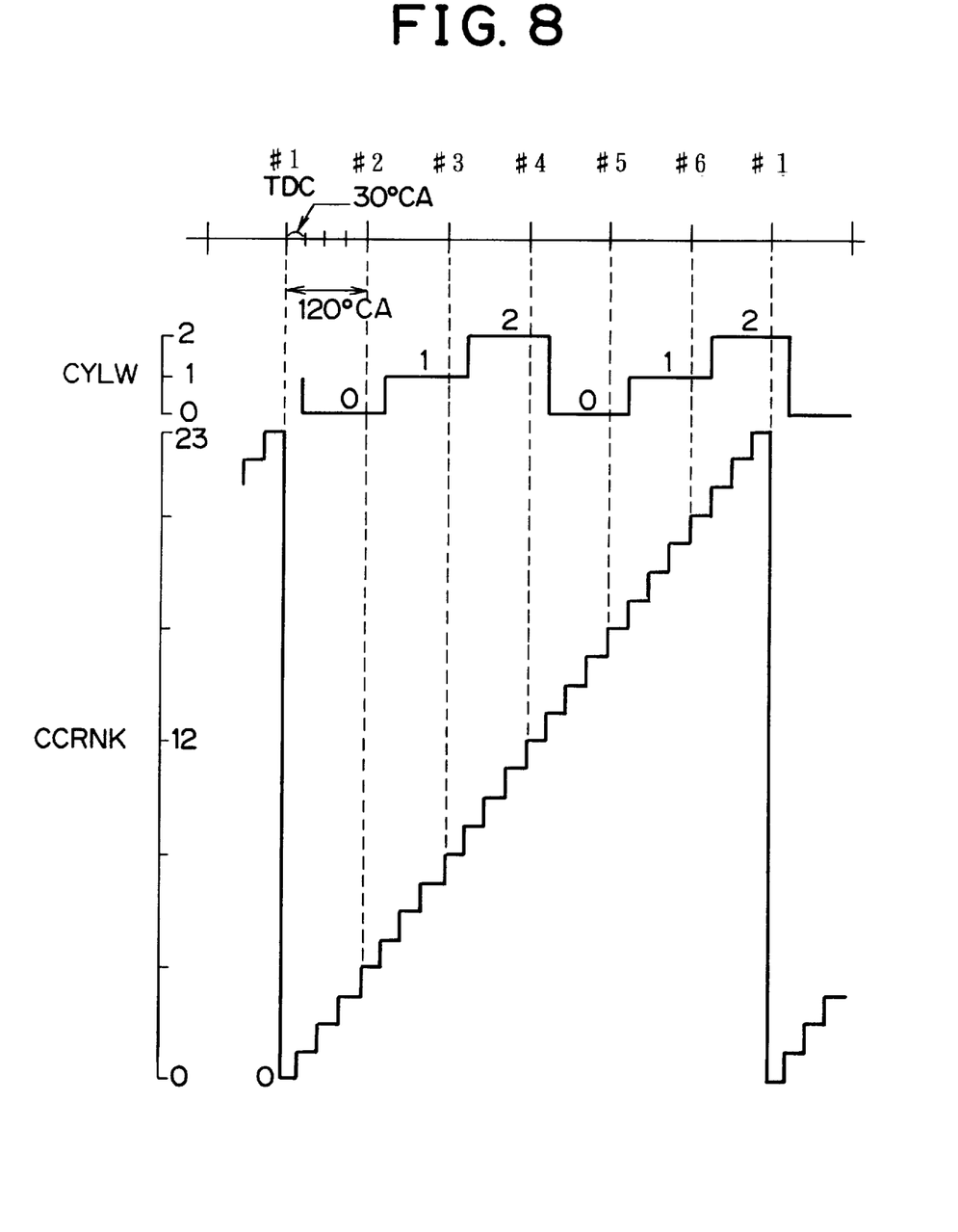
FIG. 8 illustrates a way to determine which cylinder is subjected to misfire.

It is then determined in the following manner which cylinder is subjected to misfire (See FIG. 8).

If CCRNK≧12, a value smaller than the CCRNK value read in step 1 by 12 is divided by 4 and an integer of the value thus obtained is defined as CYLW. If CYLW=0, the cylinder #1 is the first cylinder subjected to misfire; If CYLW=1, the cylinder #2 is the first cylinder subjected to misfire; and If CYLW=2, the cylinder #3 is the first cylinder subjected to misfire. If CCRNK<12, the value read in step 1 is divided by 4 and an integer of the value thus obtained is defined as CYLW.

If CYLW=0, the cylinder #4 is the first cylinder subjected to misfire; If CYLW=1, the cylinder #5 is the first cylinder subjected to misfire; and If CYLW=2, the cylinder #6 is the first cylinder subjected to misfire. In steps 11 through 15, it is determined whether only one of the cylinders is subjected to misfire, two of the cylinders are consecutively subjected to misfire, or two of the cylinders are intermittently subjected to misfire. The steps 11 through 15 correspond to misfire pattern determination means.

First, it is determined in step 11 whether or not T1 is larger than k1×T3. If YES in step 11, a flag XMF3 indicating that two of the cylinders are intermittently subjected to misfire is set and the operation proceeds to step 16. If NO in step 11, the operation proceeds to step 12.

It is then determined in step 12 whether or not T2 is larger than k2×T3. If YES in step 12, a flag XMF2 indicating that two of the cylinders are consecutively subjected to misfire is set and the operation proceeds to step 16. If NO in step 12, a flag XMF1 indicating that only one of the cylinders is subjected to misfire is set and the operation proceeds to step 16. In step 16, in preparation for subsequent calculation, T1, T1 and T2 are replaced by T2, T2 and T3 respectively. Thus, the operation ends.

If the flag indicating that only one of the cylinders is subjected to misfire is set in step S13, the flag indicating that two of the cylinders are consecutively subjected to misfire is set in step 14, or the flag indicating that two of the cylinders are intermittently subjected to misfire is set in step 15, it would be preferable to advise a driver of the occurrence of misfire by means of an appropriate alarm.

Although this embodiment employs an electronic control unit (ECU) which not only determines the patterns of misfire but also performs fuel injection amount control, ignition timing control and the like, a separate computer apparatus for determining the patterns of misfire may be provided. In addition, since the engine of this embodiment has six cylinders, the patterns of misfire are unexceptionally classified into a case where only one of the cylinders is subjected to misfire, a case where two of the cylinders are consecutively subjected to misfire and a case where two of the cylinders are intermittently subjected to misfire. In this embodiment, the crank shaft rotates normally prior to ignition of the cylinder to be ignited three cylinders (corresponding to 360° CA) earlier in the ignition sequence than the last cylinder subjected to misfire. Hence, instead of using T1, T2 and T3, the determination can also be made based on a difference in rotational fluctuation amount between the last cylinder subjected to misfire and the cylinder ignited three cylinders earlier in the ignition sequence than that cylinder. For example, T1$_{360}$ is defined as a difference between T1 and T4, T2$_{360}$ is defined as a difference between T2 and T5, and T3$_{360}$ is defined as a difference between T3 and T6. The determination can be made based on the values of T1$_{360}$, T2$_{360}$ and T3$_{360}$. It is thus possible to eliminate the influences of deviation in manufacturing quality of teeth of the rotor constituting the crank angle sensor 6 and to perform precise control.

While the present invention has been described with reference to what is presently considered to be a preferred embodiment thereof, it is to be understood that the invention is not limited to the disclosed embodiment or constructions. On the contrary, the invention is intended to cover various modifications and equivalent arrangements included within the spirit and scope of the invention.

What is claimed is:

1. A misfire detecting device for a multi-cylinder internal combustion engine, comprising:

means for calculating a rotational fluctuation amount based on a difference between a time period corresponding to a predetermined crank angle during an explosion stroke of a first one of a pair of consecutively ignited cylinders and a time period corresponding to a predetermined crank angle during an explosion stroke of a second one of the pair of consecutively ignited cylinders, wherein the second one of the consecutively ignited cylinders precedes the first one of the consecutively ignited cylinders in an ignition sequence;

means for determining, when the calculated rotational fluctuation amount exceeds a first predetermined value, whether rotational fluctuation periodically occurs every time a certain cylinder is ignited and for determining, when the rotational fluctuation amount exceeds a second predetermined value, that said rotational fluctuation results from misfire, wherein the second predetermined value is larger than the first predetermined value;

means for identifying a particular one of the cylinders which has misfired; and means for determining, by comparing the rotational fluctuation amount in the particular cylinder identified by the misfire cylinder identification means with the rotational fluctuation amount in a following cylinder undergoing an explosion stroke immediately after the particular cylinder and the rotational fluctuation amount in a later cylinder undergoing an explosion stroke immediately after the following cylinder, whether a misfire pattern is one of the following misfire patterns:

a single cylinder misfire pattern wherein only the particular cylinder identified by the misfire cylinder identifying means has misfired;

a consecutive cylinder misfire pattern wherein the particular cylinder and the following cylinder have consecutively misfired; and an intermittent misfire pattern wherein the particular cylinder and a cylinder other than the following cylinder have misfired.

2. The misfire detecting device according to claim 1, wherein said misfire pattern determination means further comprises:

means for temporarily determining, when the rotational fluctuation amount exceeds the first predetermined value, that the rotational fluctuation results from misfire;

means for detecting an emergence interval of the rotational fluctuation temporarily judged to result from misfire and for determining, when the emergence interval of the rotational fluctuation temporarily judged to result from misfire assumes a predetermined value, that the rotational fluctuation temporarily judged to result from misfire occurs periodically each time a certain cylinder is ignited;

wherein, when the rotational fluctuation temporarily judged to result from misfire and judged to be a periodical fluctuation exceeds the second predetermined value, the determining means determines that the rotational fluctuation results from misfire and the means for identifying identifies a particular one of the cylinders which has misfired.

3. The misfire detecting device according to claim 1, wherein said misfire pattern determination means calculates a rotational fluctuation amount 1 in the particular cylinder N1, a rotational fluctuation amount 2 in the following cylinder N2 and a rotational fluctuation amount 3 in the later cylinder N3 and determines, where k1 and k2 are predetermined constants, that:

(1) when amount 1×k1<amount 3, the cylinders N1 and N3 are intermittently subjected to misfire;

(2) when amount 1×k1≧amount 3 and amount 1×k2≧amount 2, the cylinders N1 and N2 are consecutively subjected to misfire; and (3) when amount 1×k1≧amount 3 and amount 1×k2≧amount 2, only the cylinder N1 is subjected to misfire.

4. A misfire detecting method for a multi-cylinder internal combustion engine, comprising the steps of:

sequentially calculating a rotational fluctuation amount based on a difference between a time period corresponding to a predetermined crank angle during an explosion stroke of a first one of a pair of consecutively ignited cylinders and a time period corresponding to a predetermined crank angle during an explosion stroke of a second one of a pair of consecutively ignited cylinders, wherein the second cylinder of the pair of consecutively ignited cylinders precedes the first cylinder of the pair of consecutively ignited cylinders in an ignition sequence;

determining, when the rotational fluctuation amount calculated exceeds a first predetermined value, whether rotational fluctuation periodically occurs every time a certain one of the cylinders is ignited and determining, when the rotational fluctuation amount exceeds a second predetermined value which is larger than the first predetermined value, that the rotational fluctuation results from misfire;

identifying a particular one of the cylinders subjected to the rotational fluctuation judged in the misfire determining step to result from misfire; and determining, by comparing the rotational fluctuation amount in the particular cylinder identified in the misfire cylinder identification step with the rotational fluctuation amount in a following cylinder undergoing an explosion stroke immediately after the particular cylinder and the rotational fluctuation amount in a later cylinder undergoing an explosion stroke immediately after the following cylinder, whether a misfire pattern is one of the following misfire patterns:
- a single cylinder misfire pattern wherein only the particular cylinder identified by the misfire cylinder identifying means has misfired;
- a consecutive cylinder misfire pattern wherein the particular cylinder and the following cylinder have consecutively misfired; and
- and an intermittent misfire pattern wherein the particular cylinder and a cylinder other than the following cylinder have misfired.

5. The misfire detecting method according to claim 4, wherein said step of determining the occurrence of misfire further comprises the steps of:
- temporarily determining, when the rotational fluctuation amount exceeds the first predetermined value, that the rotational fluctuation results from misfire;
- detecting an emergence interval of the rotational fluctuation temporarily judged to result from misfire;
- determining, when the emergence interval of the rotational fluctuation temporarily judged to result from misfire assumes a predetermined value, that the rotational fluctuation temporarily judged to result from misfire occurs periodically every time the particular one of the cylinders is ignited;
- determining, when the rotational fluctuation temporarily judged to result from misfire and judged to be a periodic fluctuation exceeds the second predetermined value which is larger than the first predetermined value, that the rotational fluctuation results from misfire; and
- identifying the cylinder subjected to the rotational fluctuation judged by the misfire final determination means to result from misfire is identified.

6. The misfire detecting method according to claim 4, wherein the pattern of misfire is determined by calculating a rotational fluctuation amount 1 for the particular cylinder N1, a rotational fluctuation amount 2 for the following cylinder N2 and a rotational fluctuation amount 3 for the later cylinder N3 and determining, where k1 and k2 are predetermined constants, that:
(1) when amount $1 \times k1 <$ amount 3, the cylinders N1 and N3 are intermittently subjected to misfire;
(2) when amount $1 \times k1 \geq$ amount 3 and amount $1 \times k2 <$ amount 2, the cylinders N1 and N2 are consecutively subjected to misfire; and
(3) when amount $1 \times k1 \geq$ amount 3 and amount $1 \times k2 \geq$ amount 2, only the cylinder N1 is subjected to misfire.

* * * * *